United States Patent Office

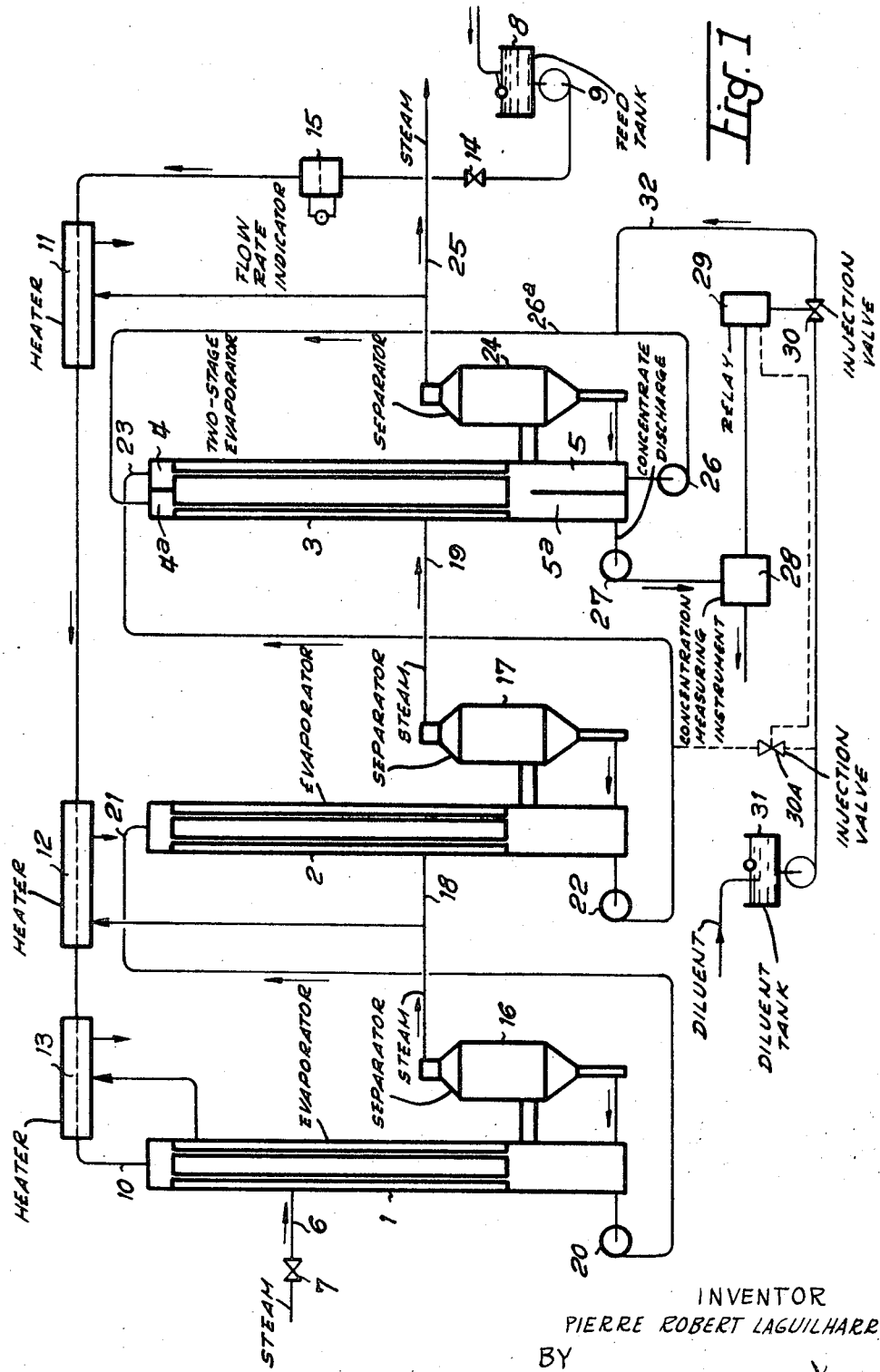

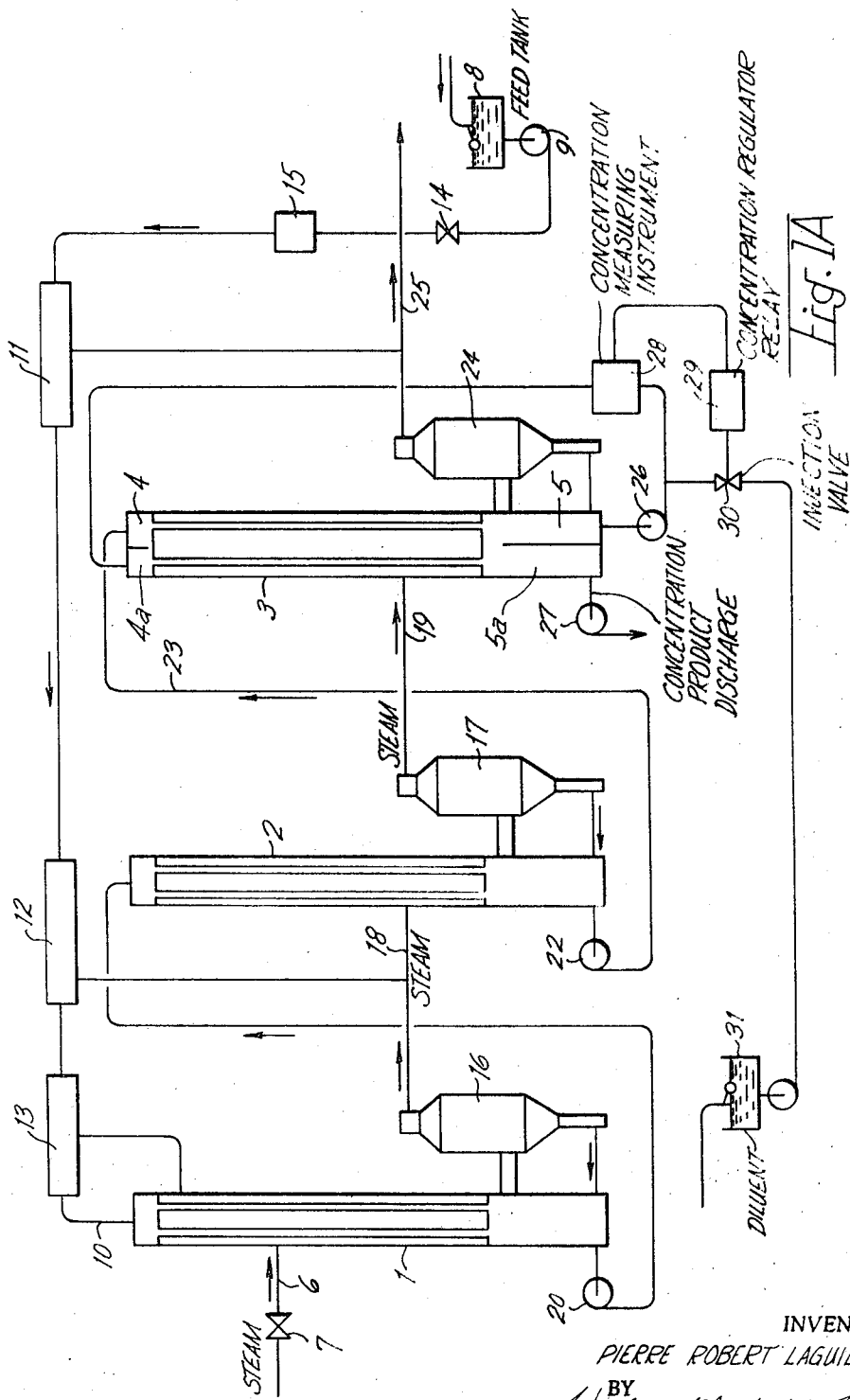

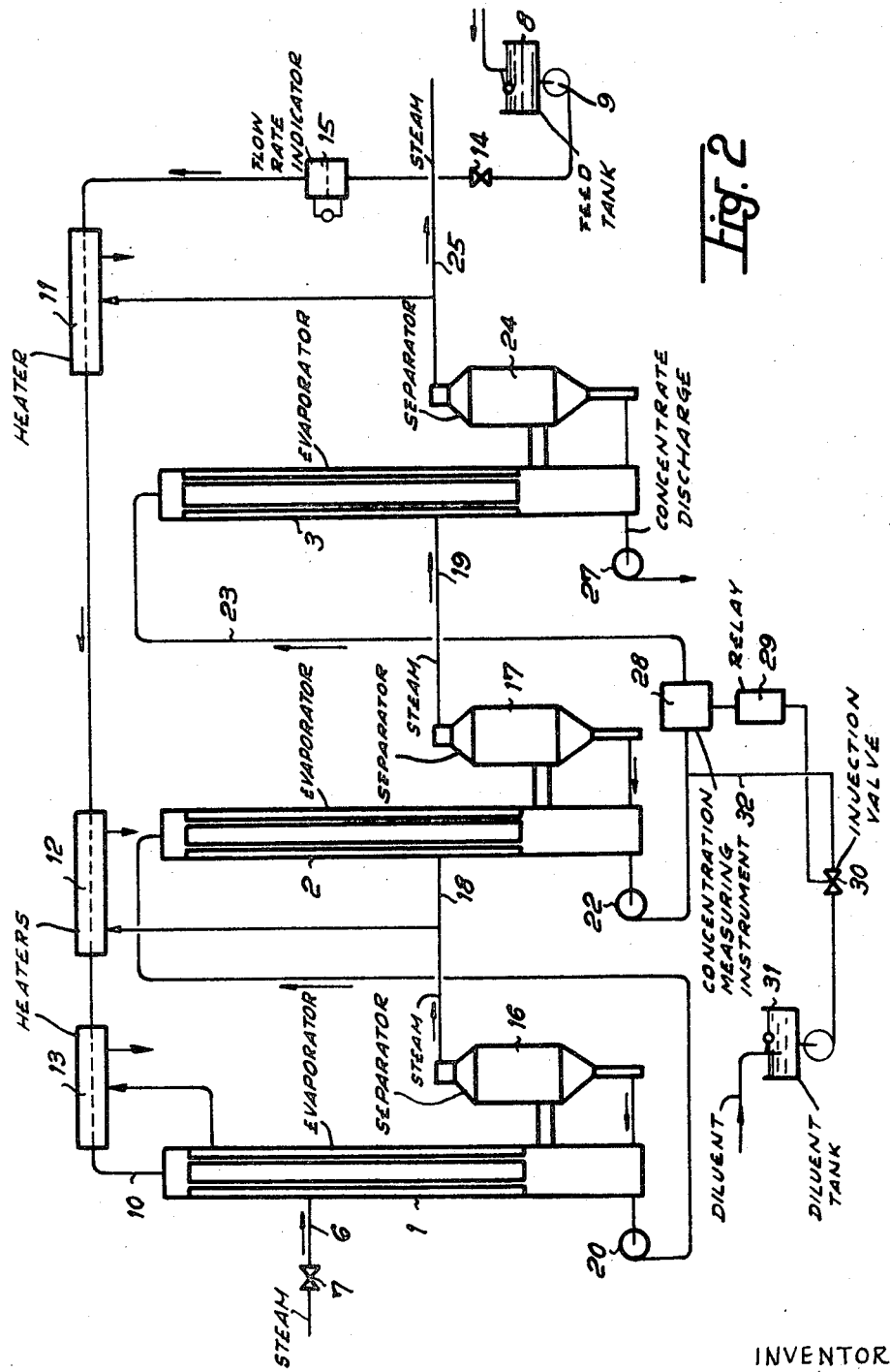

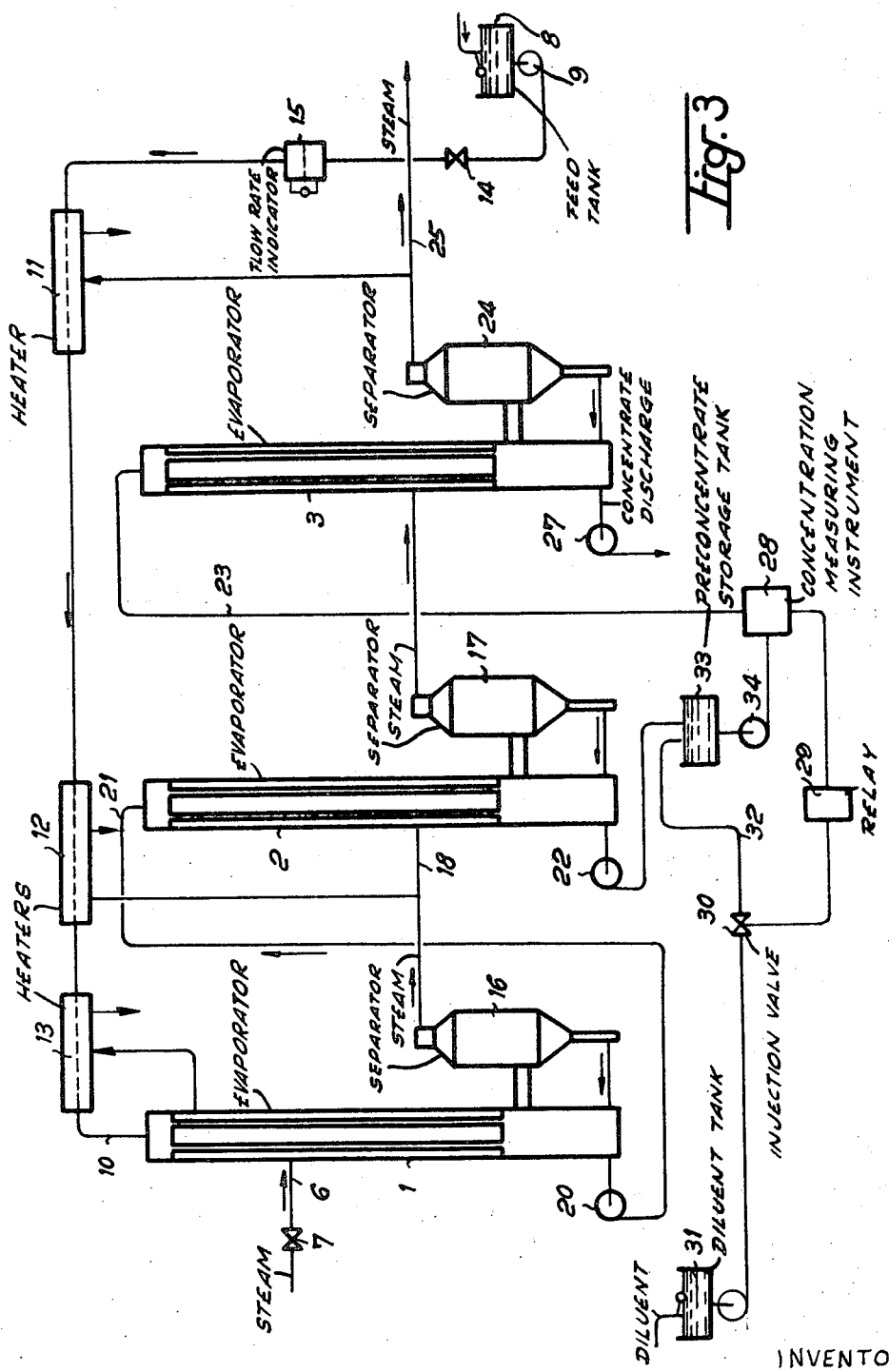

3,469,616
Patented Sept. 30, 1969

3,469,616
METHOD FOR REGULATING CONCENTRATION IN EVAPORATORS, IN PARTICULAR IN MULTIPLE-EFFECT EVAPORATORS
Pierre Robert Laguilharre, 6 Rue Robin, Enghien-les-Bains, Val-d'Oise, France
Filed Jan. 31, 1967, Ser. No. 612,985
Claims priority, application France, Feb. 2, 1966, 48,138; May 20, 1966, 62,325
Int. Cl. B01d 1/30
U.S. Cl. 159—47                                    12 Claims

ABSTRACT OF THE DISCLOSURE

A process for regulating the final outlet concentration in a multiple-effect evaporator having a plurality of groups of evaporation tubes. The concentration is controlled by injecting a suitable diluent into the product from one of the groups of tubes at a point upstream of the last group of evaporation tubes. The injection of diluent is controlled by measuring the concentration of the product at a point downstream of the point of injection, whereby the measured concentration automatically regulates the amount of diluent injected into the system.

---

The present invention is directed to a method for regulating concentration in evaporators, in particular in multiple-effect evaporators, this method being primarily intended for use in conjunction with a regulator which is subjected to the action of the outlet concentration of the evaporator in order to constitute an automatic regulating loop.

It is known to take continuous measurements of the concentration of the product obtained at the delivery end of an evaporator for the purpose of carrying out automatic regulation of the concentration. However, serious difficulties are usually encountered, especially in the case of multiple-effect evaporators, owing to the fact that industrial units are of large size and have high thermal inertia. As a consequence, there is a considerable dead time in multiple-effect evaporators between the action of the regulator on the apparatus and the result produced in the form of a variation in concentration in the desired direction.

Another known expedient for regulating concentration consists in mixing the product at the delivery end of the evaporator with a product which has a lower concentration so as to restore the product to the desired concentration by dilution. But this mode of regulation presupposes a degree of concentration at the outlet of the evaporator which is higher than that which is actually desired. In point of fact, the viscosity of the products usually increases very rapidly with the degree of concentration, with the result that the product is liable to become very difficult to handle whereas it can readily be handled at the desired concentration or after dilution as obtained by automatic regulation. This can give rise to disadvantages of a particularly troublesome nature in the case of certain products which tend to clog the heating surfaces in a non-reversible manner above a given degree of concentration.

The method of regulation according to the invention is primarily intended to circumvent these serious disadvantages in the case in which it proves necessary to regulate the final outlet concentration of the evaporator. But the method can also be employed in a more general manner for the purpose of regulating the concentration at the outlet of any one stage of a multiple-effect evaporator.

From the general standpoint which has just been stated, the method according to the invention essentially consists in that a suitable diluent is injected into the product or liquid being processed at a point located upstream of the final evaporation tube nest which leads to the extraction of the concentrated product whose concentration is to be regulated, said injection being controlled automatically by the instrument employed for measuring the concentration considered in order to make this latter stable and independent of the variations which inevitably occur under the action of different factors involved (such as variations in dry extract of the product to be concentrated, temperature of product, slight variations in the amount of heat supplied and so forth).

The diluent employed can be either low-concentration product, pure water, condensates or any other solvent which is suited to the product to be processed. Preferably, said diluent is injected into the product at the temperature of evaporation of the effect in which said injection takes place in order not to cause any variation in the quantity of heat removed in the form of steam.

The method according to the invention is of special interest in the case of condensation-film evaporators in which the quantity of product being circulated is of a low order, and of even greater interest in units of this type in which the product is passed twice or a greater number of times in the final effect within a single evaporator body, as described in French Patent No. 1,303,174 of July 28, 1961.

The advantages arising from this method are mainly as follows:

(1) At no point of the evaporator is the degree of concentration higher than the desired final concentration.

(2) The response time of the regulation is short, thereby permitting of particularly efficient regulation. This advantage is particularly marked in the case in which the final effect of the evaporator is designed in accordance with the above-cited French Patent No. 1,303,174, the response time being in that case extremely short.

(3) It is possible to utilize the final heat-transfer surfaces of the evaporator up to the limit of permissible concentration.

According to an advantageous mode of execution of the invention, the constancy of concentration of the pre-concentrated product is obtained by injecting the diluent into the product prior to its admission into the final tube bundle which leads to the extraction of the final concentrate and upstream of the instrument employed for measuring the concentration of the preconcentrated product which controls said injection automatically. Under these conditions, inasmuch as the percentage of dry extract is constant at the inlet of the final tube bundle which leads to the extraction of final concentrate, and provided that the evaporation produced by said final tube bundle is virtually constant, then the degree of concentration of the final product will also be virtually constant.

In the form of execution which has just been defined, the measurement of concentration of the preconcentrated product can be performed directly at the outlet of a tube bundle located immediately upstream of the bundle which leads to the extraction of the final concentrate, and preferably between the penultimate tube bundle and final bundle. Alternatively, the concentrated product which is withdrawn from a tube bundle which precedes the final bundle can be stored in an intermediate tank and the measurement of its concentration can be performed on the path of the preconcentrate between the point of discharge from the tube bundle considered and the point at which it is admitted to the final bundle. In this case, the injection of diluent into the preconcentrated product can take place either between the outlet of the tube bundle from which said preconcentrate has been withdrawn and the storage tank or alternatively within the storage tank itself, or even downstream of said tank but in all cases on the upstream side of the concentration-measuring instrument.

The final tube bundle which leads to the extraction of the final concentrate can be supplied with steam derived from a preceding effect in the case of an evaporator unit which comprises a plurality of evaporation bodies. Alternatively, the final bundle referred-to can be constituted by a finisher which is supplied with steam derived from another source and preferably a constant-output source, for example live steam or steam which is recompressed by a thermocompressor. In order to reduce any variations of evaporation in the final tube bundle to a minimum, said tube bundle can usefully be divided into at least two evaporation bodies through which the product is caused to pass successively, as described in French Patent No. 1,303,174 of July 28, 1961 already mentioned. In this case, the measurement of concentration and the injection of diluent are preferably carried out between the extraction of concentrate from the first evaporation body and its introduction in the second evaporator body.

In all cases, and in accordance with a further improvement which is contemplated by the invention, any desired addition product can be incorporated in the preconcentrated product after measurement of its concentration and prior to its admission in the final tube bundle which leads to the extraction of final concentrate.

This arrangement is applicable in particular for the manufacture of milk products in which fats have to be incorporated. The quantity of milk fat which is introduced in the product can be regulated automatically as a function of the quantity of nonfat dry solids contained in the product or as a function of the flow rate of the product at the inlet of the evaporator, or alternatively as a function of the flow rate of the preconcentrated product whose concentration is regulated. There is thus obtained a "fatty" concentrate containing a constant percentage of total dry solids and a percentage of fat which is also constant with, as a consequence, a constant ratio of fat content to total dry solids content.

It is admittedly a common procedure to mix the fat with the milk concentrate at the outlet of the evaporator. However, the viscosity of the milk which is thus concentrated results in a less intimate mixture than if, as contemplated by the present invention, the fatty substance is mixed with the milk before it has attained its final content of nonfat dry solids. Furthermore, the passage of the fatty substance through the evaporator effects the de-aeration of said substance. It is also known that the density of a milk product containing fat varies less rapidly as a function of the dry extract content of said product than the density of skim milk and that, even in the case of products containing a high percentage of fat, the density of the concentrate varies very little as a function of their total dry extract content. It is therefore apparent that the application of the method according to the present invenion is paricularly advantageous for this type of product.

By way of novel product, the present invention also comprises the products which result from this application.

Further properties and advantages of the invention will become apparent from the complementary description which follows below, reference being had to the accompanying drawings which are given by way of non-limitative example, and in which:

FIGS. 1 to 3 show diagrammatically multiple-effect condensation-film evaporators which entail the application of the method according to the invention.

In the example which is shown in FIG. 1, the apparatus is a condensation-film or wetted-wall triple-effect evaporator in which the product or process liquid to be concentrated and its vapor circulate in parallel streams. The reference numerals 1, 2 and 3 designate the three evaporator bodies. The first two bodies 1 and 2 are of conventional design whilst the body 3 is constructed in the manner which has been described in the above-cited French Patent No. 1,303,174 of July 28, 1961, the admission chamber 4 and extraction chamber 5 of said body being divided by partitions 4a and 5a, for example, into two compartments corresponding respectively to two arrays of tubes of the evaporator body tube nest.

The evaporator body 1 is provided at 6 with an inlet for the admission of steam at a substantially constant flow rate which is controlled by a regulating valve 7. The product to be concentrated which is contained in a tank 8 and circulated by a pump 9 is fed at 10 into said evaporator body after having passed through preheating units 11, 12, 13 which correspond respectively to the three bodies 3, 2 and 1. Provision is made in the product supply pipe for a regulating valve 14 which makes it possible to obtain a virtually constant inflow rate of said product and for a flow rate indicator 15.

The extraction chambers of the first two bodies 1 and 2 are coupled in known manner with separators 16 and 17, the steam which passes out of the top of the separator 16 being fed at 18 into the body 2 and the steam which passes out at the top of the separator 17 is fed at 19 into the body 3. The product which is concentrated in the body 1 is withdrawn from the bottom of this latter by means of a pump 20 and delivered by this latter at 21 into the admission chamber of the body 2 whilst the concentrated product within this latter is withdrawn by a pump 22 and delivered through pipe 23 into one of the compartments of the feed chamber of the body 3.

The extraction chamber 5 of the body 3 is connected to a separator 24 and the steam which passes out at the top of said separator is directed through a pipe 25 towards a condenser (which has not been shown in the drawings). As is explained in French Patent No. 1,303,-174, the product is subjected to a first concentration in that part of the tube nest of the evaporator body 3 which corresponds to the compartment 4 into which the product derived from the body 2 is introduced via the pipe 23, and the liquid concentrated within the compartment 4 is collected within the extraction chamber 5 and is withdrawn therefrom by a pump 26 and delivered via a pipe 26a into the second compartment 4a. After having undergone a final concentration in said second compartment 4a, the product reaches the extraction chamber 5a and is withdrawn therefrom by a pump 27.

The concentrated product which is finally withdrawn by the pump 27 is caused to pass into an instrument for measuring concentration as shown diagrammatically in the figure by the reference 28. Said instrument can be of any suitable type such as, for example, a γ-ray density meter or a balance-type instrument. This measuring instrument is connected through a relay 29 which can also be of any known type (pneumatic, electric or otherwise) to a valve 30 which is designed to regulate the admission of a diluent liquid (such as pure water) which is supplied from a tank 31 and which, in accordance with the invention, is intended to be injected into the product before the final evaporator body which leads to the extraction of the final concentrate. In the example which is illustrated in the drawings, this injection operation is carried out from the valve 30 by way of a pipe 32 which is connected to the pipe 26a for directing the product into the second compartment of the admission chamber 4 of the body 3.

One example of application of the regulating system as thus constituted will now be described.

Assuming that the evaporation plant which is employed is of the same type as in the example hereinabove described and accordingly comprises a known regulating or control system of the manual type which permits in principle the admission of a constant flow of steam and a constant flow of product to be concentrated as well as a constant supply of water to the condenser, there do nevertheless occur small fluctuations which can be due among other factors to variations in the proportion of dry solids or in the temperature of the product to be concentrated.

Under these conditions, if it is assumed that the desired final concentration is 48%, the outlet concentration is determined by the measuring instrument 28 will fluctuate, for example, within a range of 46 to 50% which corresponds to a variation of $x$ liters of water in the water content of the concentrate. The object of the regulation which is carried out in accordance with the invention is to maintain the final concentration at 48%. To this end, the relay 29 of the regulator which is fitted with an automatic or manual start-up device is set in the position corresponding to manual start-up and the water admission valve 30 is set at a mean position such that it admits substantially $x/2$ liters of water into the pipe 26a. By means of a steam flow regulator 7 or by means of the valve 14 which serves to regulate the flow of product to be concentrated, the outlet concentration is brought to 48%. Thereupon, the relay 29 is changed over to the automatic-operation position. The regulator will then come into operation automatically in order to admit a greater or lesser quantity of water through the valve 30 and thus to maintain the concentration at the above mentioned value of 48%.

The process described in the foregoing represents the simplest form of regulation. It is also possible to devise a more complete form of regulation such that, when the valve 30 approaches its top or bottom limit of action, another device which is coupled to the regulation device 28-29 and controlled by this latter comes into operation so as to modify automatically either the heat flow or the product flow and to return the water-admission valve 30 to the mid-point of its operating range.

It wil be apparent that other modifications can be made in the device which is illustrated in FIG. 1 without thereby departing from the scope of the invention. In particular, in the case of regulation of the final concentration, it would be possible to admit a fraction of the diluent concurrently at one or a number of points of the evaporation plant other than the point indicated above. Such a system is illustrated by the dotted lines contained in FIGURE 1 wherein there is shown a further water-admission valve 30a connected between the diluent tank 31 and the pipe 23 which directs the product from the pump 22 to the inlet of the evaporator body 3. The admission valve 30a is also connected to and controlled by the relay 29, which relay is connected to the measuring instrument 28 as explained above.

It would also be possible to introduce said diluent partly in the final concentrate and partly upstream of the last evaporation tube nest.

Moreover, as has been stated above, it must be understood that the method according to the invention can be applied to the regulation of the concentration at the outlet of any one effect of a multiple-effect evaporator, the diluent being fed in each case into the product being processed upstream of the final tube nest which is immediately followed by the extraction of the concentrate whose concentration is to be regulated.

As in the example shown in FIG. 1, the apparatus which is illustrated in the two examples of FIGS. 2 and 3 is a triple-effect condensation-film evaporator with parallel streams. The same reference numerals are employed to designate the same elements as in FIG. 1, except that, in both examples now under consideration, the evaporator body 3 is of the same conventional constructional design as the bodies 1 and 2 instead of being constructed in the manner which was described in French Patent No. 1,303,174 of July 28, 1961.

In the general arrangement diagram of FIG. 2, the concentration-measuring instrument 28 is inserted in the pipe 23 which serves to connect the extraction pump 22 of the evaporator body 2 to the admission chamber of the final body 3. The injection of diluent derived from the tank 31 (such as, for example, pure water) which is controlled by the valve 30, said valve being in turn controlled from the measuring instrument 28 through the relay 29, is effected in this example via the pipe 32 into said pipe 23 upstream of the measuring instrument 28.

In the alternative form which is illustrated in FIG. 3, the preconcentrate which is withdrawn from the body 2 by the pump 22 is stored in an intermediate tank 33 from which it is taken by a pump 34 (which can be a centrifugal pump with flow-regulating valve or a variable-delivery volumetric pump) and then fed throug the pipe 23 into the admission chamber of the evaporator body 3. The concentration-measuring instrument 28 is connected into said pipe 23 and the diluent which is derived from the tank 31 is in this case fed the storage tank 33 via the pipe 32 which is controlled as in the previous example by the valve 30, said valve being controlled by the measuring instrument 28 by means of the relay 29. As has been stated earlier, the diluent could also be injected directly between the outlet of the body 2 and the storage tank 33 or downstream of the tank 33 but upstream of the measuring instrument 28.

As has already become clear from the above description, it would be feasible to contemplate other modifications in the plants which are shown in FIGS. 2 and 3. In particular, the final evaporator body which leads to the extraction of the final concentrate could also be constituted by a finisher which is supplied with steam derived either from a preceding effect or from another source. As in the example shown in FIG. 1, the final body referred-to could also be constituted by an apparatus of the type described in French Patent No. 1,303,174 and could accordingly comprise within a same body two arrays or bundles of tubes through which the product is circulated successively, the measurement of concentration and the injection of diluent being in that case carried out between the point of withdrawal from the first tube bundle and the introduction of product in the second tube bundle. Such a system is diagrammatically illustrated in FIGURE 1A, which figure is identical to FIGURE 1 except that the measuring instrument 28 is connected to the pump 26 which withdraws the concentrate from the first bundle 4 and supplies same to the second bundle 4a, the measuring instrument 28 in turn being connected to the relay 29 which controls the injection valve 30 for supplying diluent from the tank 31 into the pipeline which supplies the product to the second bundle of tubes 4a.

Furthermore, any desired addition product such as milk fat in the case in which the plant is employed for processing milk products could in all cases be incorporated in the preconcentrated product downstream of the measuring instrument and prior to admission of said preconcentrate into the final tube nest which leads to the extraction of the final concentrate. As stated earlier, the quantity of addition product and especially of milk fat in the case of manufacture of a high-fat milk product can be regulated automatically, in particular as a function of the flow rate of preconcentrated product whose concentration is regulated at a constant value when the pump which serves to supply final evaporation-tube bundle with preconcentrated product is of the volumetric type, thereby permitting the injection of fat in the preconcentrated product so as to obtain a constant ratio of milk fat to total dry solids.

What I claim is:

1. A process for regulating the concentration of the final concentrate in a multiple-effect evaporator having a plurality of groups of evaporation tubes, comprising the steps of injecting a dilution agent into the process liquid from one of the groups of evaporation tubes at a point upstream of the last group of evaporation tubes, and automatically controlling the amount of dilution agent injected by measuring the concentration of the process liquid at a point situated downstream of the point where the injection of the dilution agent takes place.

2. A process according to claim 1, in which the dilution agent comprises said process liquid and has a concentration which is weaker than the desired concentration of the final concentrate product.

3. A process according to claim 1, in which the dilution agent is substantially pure water.

4. A process according to claim 1, in which the dilution agent comprises a suitable solvent.

5. A process according to claim 1, in which the dilution agent is injected into the process liquid at a temperature substantially equal to the temperature of evaporation of the process liquid in which the dilution agent is injected.

6. A process according to claim 1, in which the dilution agent is injected into the process liquid at two distinct and different points, both of which are located upstream of the last group of evaporation tubes.

7. A process according to claim 1, in which the last group of evaporation tubes is divided into two evaporation substages through which the process liquid is caused to pass successively, said dilution agent being injected into said concentrate between said first and second substages and the measurement of the concentration being effected on the final concentrate extracted from the second substage.

8. A process according to claim 1, in which the measurement of the concentration is effected at the outlet of a group of evaporator tubes preceding the last group of evaporator tubes.

9. A process according to claim 8, in which the measurement of the concentration is effected directly at the outlet of the group of evaporation tubes which immediately precede the last group of evaporation tubes.

10. A process according to claim 1, in which the last group of evaporation tubes is divided into two evaporation substages through which the process liquid is caused to pass successively, the measurement of the concentration and the injection of said dilution agent being effected on the process liquid extracted from the first substage before same is introduced into the second substage.

11. A process according to claim 1, in which the process liquid extracted from the group of evaporation tubes immediately preceding the last group of evaporation tubes is supplied to and stored in an intermediate tank with the process liquid from said intermediate tank being supplied to the last group of tubes, the measurement of the concentration being effected on the process liquid between the last group of tubes and said immediately preceding group of tubes, and said dilution agent being injected into said process liquid at a point between said last group of tubes and said immediately preceding group of tubes upstream of the point of measurement.

12. A process according to claim 11, in which the dilution agent is injected into said intermediate tank.

References Cited

UNITED STATES PATENTS

| 1,028,738 | 6/1912 | Kestner. | |
| 2,576,496 | 11/1951 | Ziegler | 159—44 X |
| 3,035,634 | 5/1962 | Waine et al. | 159—44 |
| 3,203,466 | 8/1965 | Eckstrom | 159—44 |

FOREIGN PATENTS

| 956,086 | 4/1964 | Great Britain. |
| 1,176,344 | 4/1959 | France. |

NORMAN YUDKOFF, Primary Examiner

J. SOFER, Assistant Examiner

U.S. Cl. X.R.

159—17 44, 46